F. C. SANFORD.
GEAR SHIFTING MECHANISM FOR AUTOMOBILES.
APPLICATION FILED APR. 10, 1917.
1,277,134.
Patented Aug. 27, 1918.
4 SHEETS—SHEET 1.
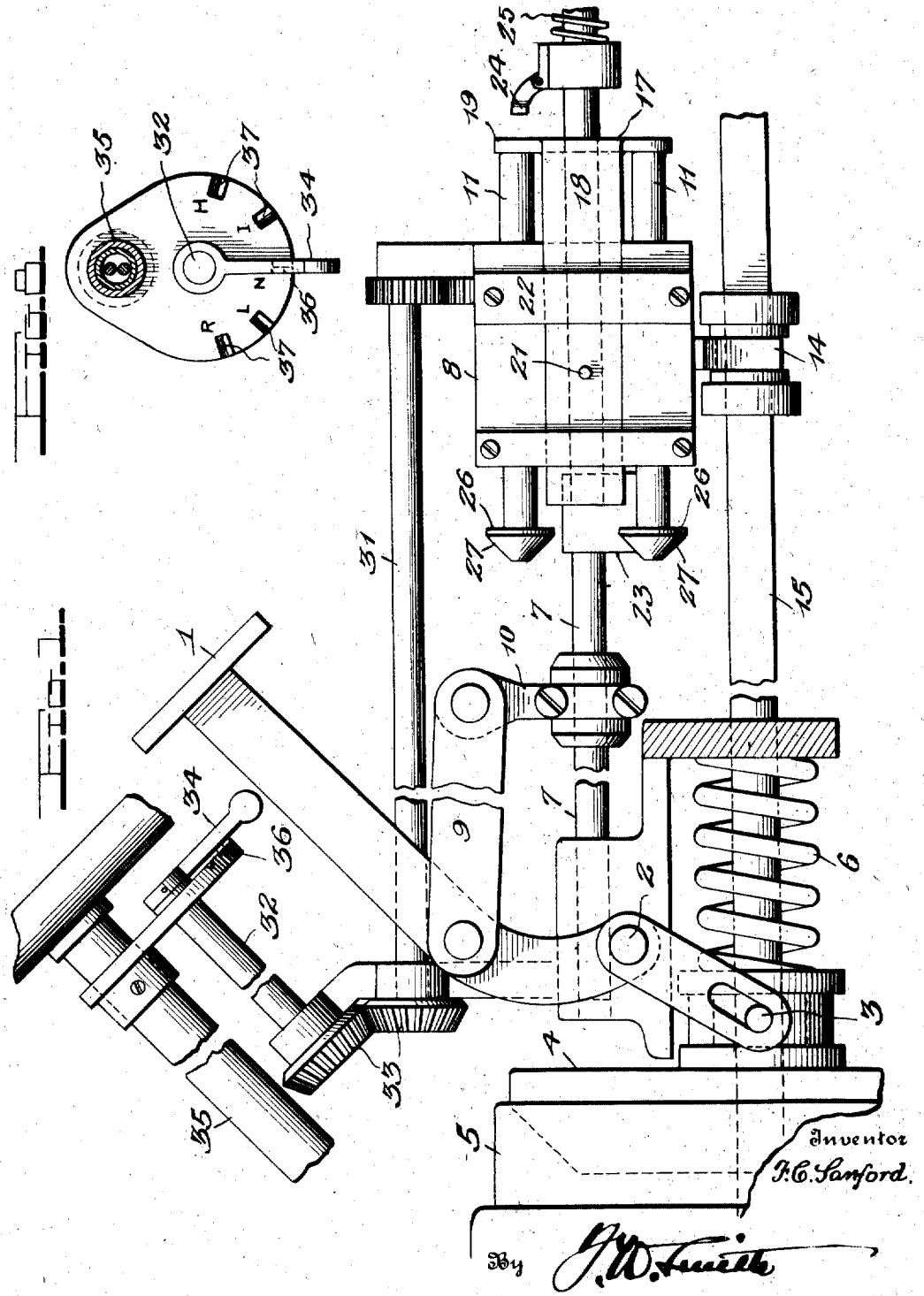
Inventor
F. C. Sanford.
By
Attorney

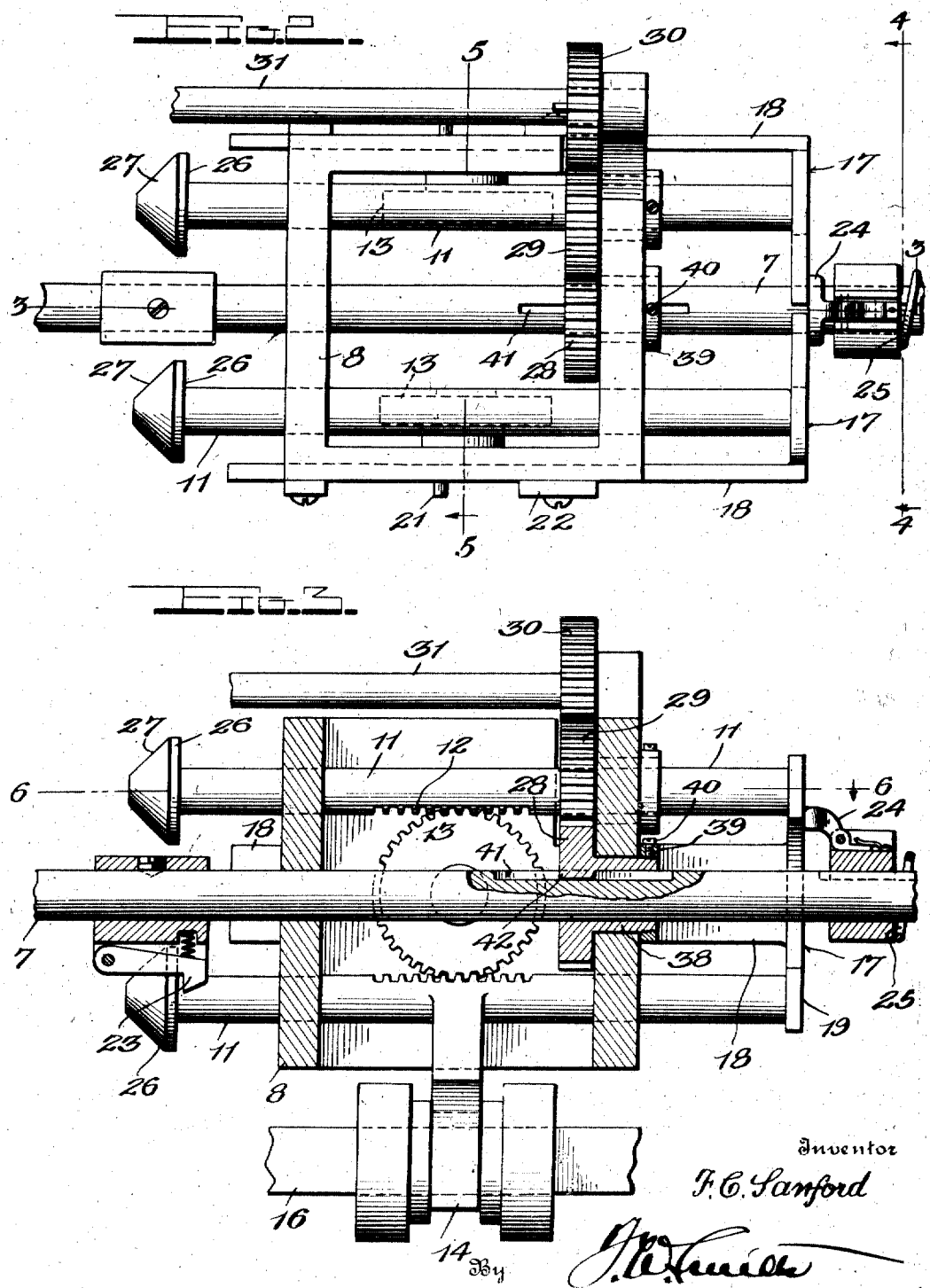

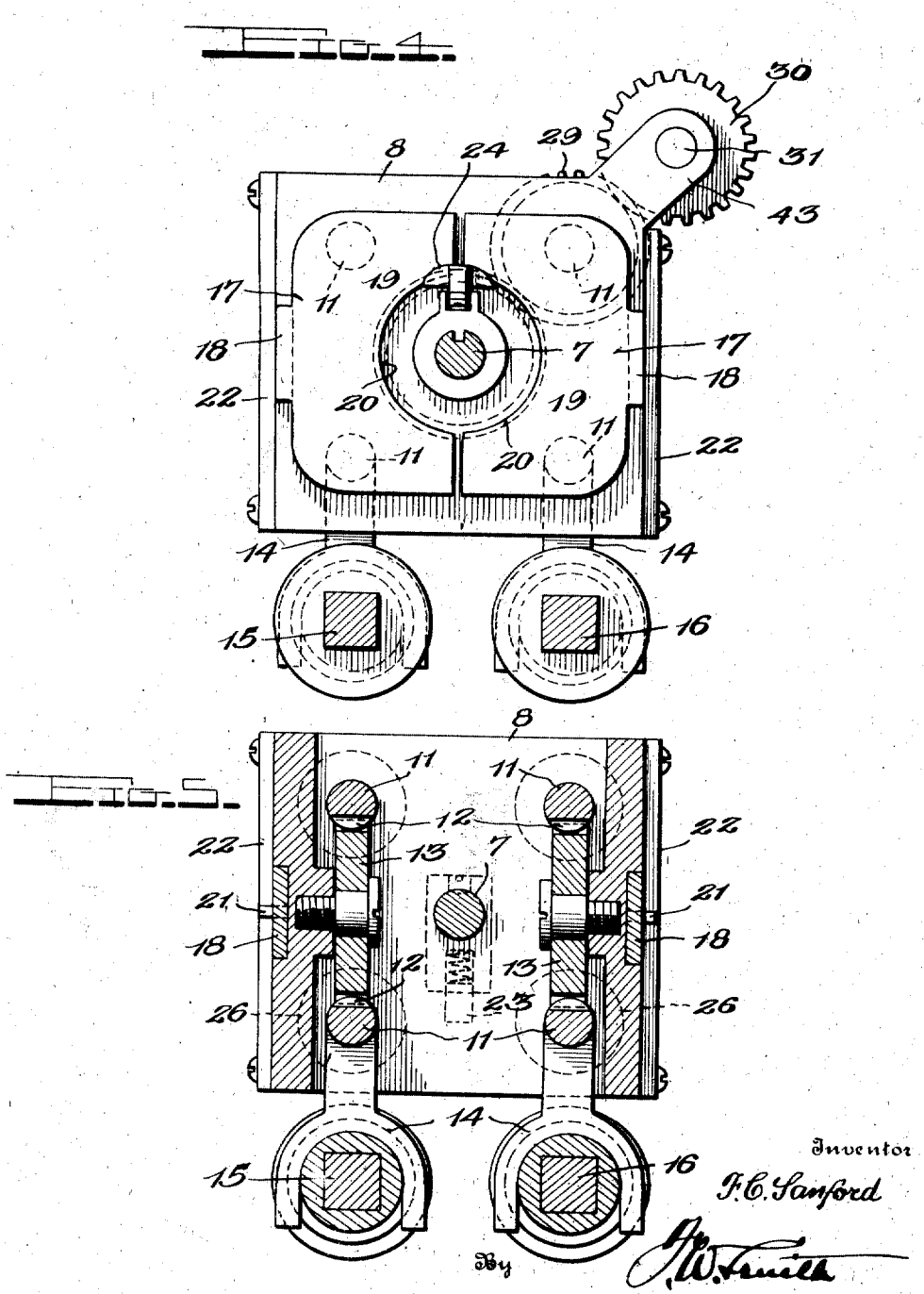

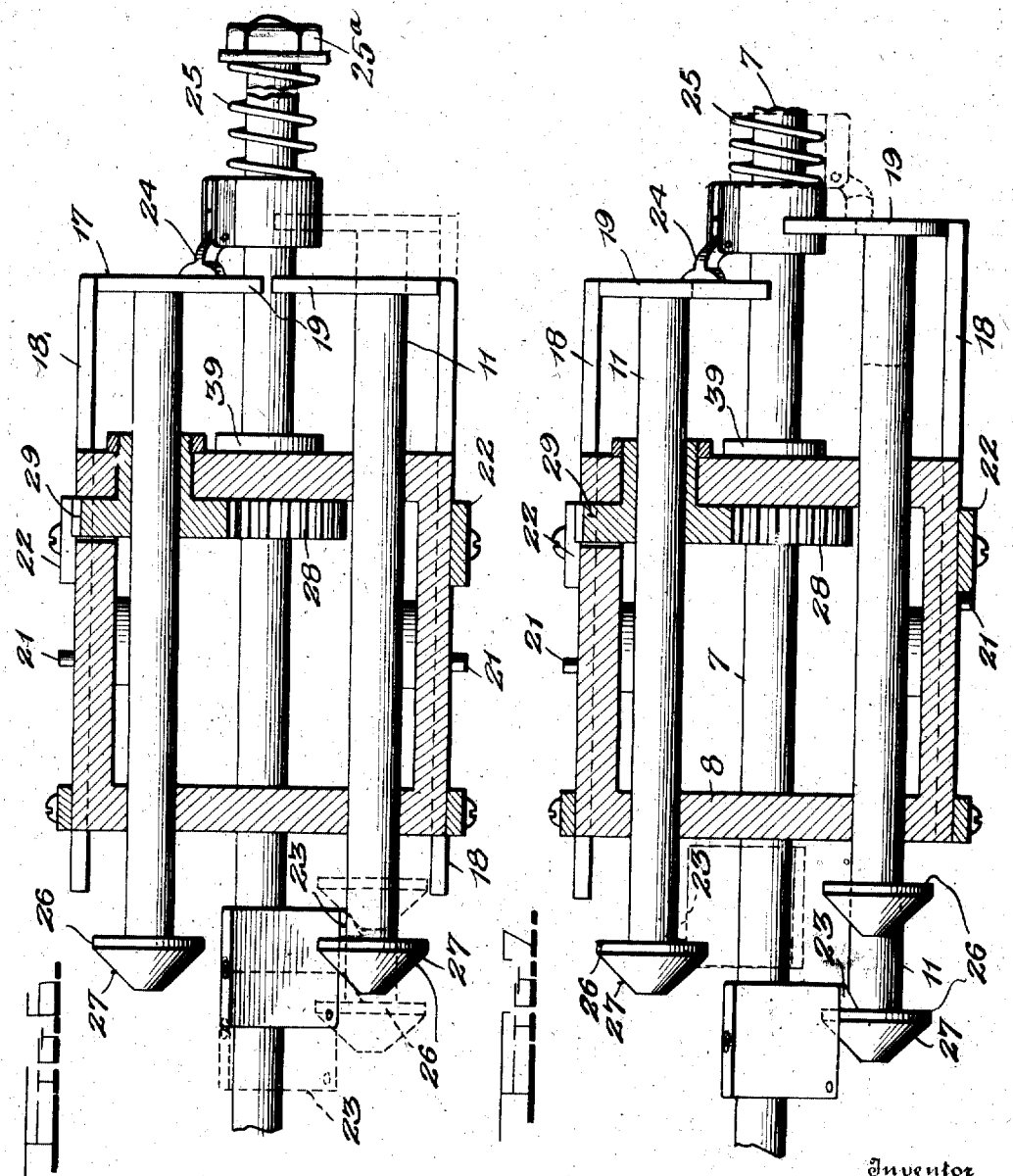

UNITED STATES PATENT OFFICE.

FRANK C. SANFORD, OF BRIDGEPORT, CONNECTICUT.

GEAR-SHIFTING MECHANISM FOR AUTOMOBILES.

1,277,134.  Specification of Letters Patent.  Patented Aug. 27, 1918.

Application filed April 10, 1917. Serial No. 160,988.

*To all whom it may concern:*

Be it known that I, FRANK C. SANFORD, a citizen of the United States, residing at the city of Bridgeport, county of Fairfield, State of Connecticut, have invented certain new and useful Improvements in Gear-Shifting Mechanism for Automobiles; and I do declare the following to be a full, clear, and exact description of the invention, such as will enable others skilled in the art to which it appertains to make and use the same.

This invention relates to certain new and useful improvements in gear shifting mechanism, and it has for an object to provide a novel and improved shifting mechanism having connection with the clutch lever or pedal whereby on throwing out the clutch the selected gear will be shifted into mesh so that when the clutch is again thrown in the desired speed or relation between the transmission gears will have been obtained.

Further, the invention aims to provide an improved selecting mechanism for positioning the several elements whereby on operating the clutch pedal the proper gear will be shifted in the transmission.

The invention further resides and consists in the features of construction and the arrangements and combinations of parts hereinafter described in detail and succinctly defined in the appended claims, reference being had to the accompanying drawings wherein—

Figure 1 is a side elevation of the improved gear shifting mechanism showing its connection and association with the clutch and the clutch operating pedal;

Fig. 2 is a top plan view of the gear shifting mechanism, *per se*, with the actuator slightly advanced for returning all gears to neutral position;

Fig. 3 is a vertical section therethrough on line 3—3 of Fig. 2;

Fig. 4 is an end elevation looking at the mechanism on line 4—4 of Fig. 2;

Fig. 5 is a transverse section through the mechanism on line 5—5 of Fig. 2;

Fig. 6 is a longitudinal section on line 6—6 of Fig. 3 showing the parts in a position to start the throwing in of the gear; and Fig. 7 is a similar view showing the relation of the parts after the completion of the gear shifting operation.

Fig. 8 is a detail of the selector device.

Referring to corresponding parts throughout the several views by like characters of reference, the numeral 1 designates the usual clutch operating pedal which is pivoted at 2 and has connection at 3 with the clutch part 4 whereby when the pedal is depressed the clutch part 4 is thrown out of operative engagement with its coöperating clutch part 5, and when the pedal is released the clutch parts are moved into operative relation by the clutch spring 6, in an obvious manner.

The gear shifting mechanism comprises a selector or actuator rod 7 which is slidably mounted in a frame 8 and is connected by a link 9 and arm 10, fixedly secured on said rod, to the clutch pedal whereby on pushing in the latter the rod will be slid in its bearings.

Gear shifting bars 11 are slidably disposed in the frame 8 and, while any number of such bars may be provided, there has been shown only four arranged in coöperating pairs. The bars are in the form of rack members having opposing teeth 12 with which intermesh the teeth of a connecting, interposed pinion 13 so that movement of one bar, of each pair, in one direction will effect opposite movement of the companion bar.

The lower bar of each pair carries a depending fork or arm 14 for shifting the transmission gears (not shown) that are slidably arranged on the shafts 15 and 16. The opposite outer sides of the frame are provided with grooves or guide ways to receive slidably the bar returning or controlling members 17, each consisting of a shank 18 and a right angular abutment head 19 of sufficient breadth to span both rack bars of the adjacent pair. The heads 19 have their free opposing edges closely related and formed with complementary semi-circular cut-outs 20 through which the selector rod projects. The sliding movement of the controlling members 17 is defined by stop pins 21 positioned on the shanks for engaging the transversely arranged bars 22.

Forward of the frame, the selector rod carries a spring projected dog 23 and rearwardly of the frame a second spring projected dog 24 is splined for relative sliding movement, the same being yieldingly urged forward by a coiled spring 25 secured on the rod by a nut 25ª. Each gear shifting bar is provided with a head 26 having a forward cam face 27, the head being engaged by the dog 23 to effect the shift of a gear and the cam face permitting return movement of the dog should the selector rod have been rotated while in abnormal position.

Rotary movement of the selector rod is effected through a train of gears 28, 29 and 30, a shaft 31 to which the gear 30 is fixed, a second shaft 32, bevel gearing 33 connecting the shafts, and the operating lever 34, said shaft 32 being journaled alongside the steering post or mast 35 of the automobile and supporting said lever 34 on its upper end within convenient and easy reach. A segment 36 is provided to facilitate the positioning of the selector rod and to indicate the relation of the transmission gears, said segment being suitably marked as at 37, for guidance in operating the lever.

Gear 28 is provided with a hub support 38 that is journaled in the frame 8 and held against displacement by a nut 39 and screw 40. The selector rod 7 is formed with a longitudinal groove 41 in which extends a feather 42 from gear 28 to permit relative sliding only of the rod. The gear 29 is preferably journaled in the frame concentric with one of the rack bars, while gear 30, with its shaft 31, is supported in a bracket arm 43 on the frame.

The operation of the mechanism is as follows:

With the lever 34 engaged in the notch beneath the designation "N," the selector rod will be disposed in neutral position wherein the dogs 23 and 24 are in a vertical plane between the pairs of rack bars, as in Figs. 2 and 3. In this connection it will be noted that the dogs are arranged on opposite sides of the selector rod for reasons hereinafter set forth. The dog 24 has its active face sufficiently wide to engage simultaneously both gear controlling members 17, as depicted in Fig. 2. Thus, with the selector rod in neutral position, the clutch pedal is pushed in to throw out the clutch and, through link 9, pull the selector rod forward. The dog 24 engages both abutment heads 19 and brings them to normal position, in which position the gear shift arms 14 have moved all their gears into neutral or inoperative relation. The clutch pedal is then released to permit its spring 6 returning the selector rod to normal position and the clutch to operative position.

To start the automobile, the operating lever is moved to the first or low speed, indicated by the letter "L" in Fig. 8. Thus, through the selecting mechanism the dog 23 is turned counter clockwise into the path of the head 26 of the lower bar 11 while the dog 24 is moved to engage the controlling member 17 for the other pair of rack bars. On pushing in the clutch pedal now, the dog 24 will hold the head 19 against both of its rack bars to positively hold the connected transmission gears in neutral position during the shifting of the desired and predetermined transmission gears that are connected to the engaged pair of rack bars, the lower one of which is engaged by the dog 23 and carried forward with the selector rod. Through the instrumentality of the connected pinion 18, the upper rack bar is shifted back, carrying the controlling member 17 with it similar to that shown in Fig. 7.

To change the relation of the gears for intermediate speed, the lever 34 is swung to engage in the notch designated "I" which movement will rotate the selector rod to bring the dog 23 into a position to actuate the lower rack bar of the other pair and the dog 24 to engage the other gear controlling member in which connection it will be noted that in its normal position the dog 24 is sufficiently far back to engage the abnormally disposed head 19. This position is indicated by dotted lines in Fig. 7, wherein it will be noted that the dog 24 engages the rearwardly disposed head 19 preliminary to dog 23 coming into operation. From Fig. 6 it is seen that the dog 24 practically completes its function, namely, returning the meshed gears to neutral position, before the dog 23 engages with the head 26. By this provision, the shifting of one set of gears into meshing relation, while the previously meshed gears are still operatively related, is guarded against and positively prevented.

To shift from intermediate to high speed, the lever 34 is moved to notch "H" which brings the dog 23 in line with the head of the upper bar 11, directly over the intermediate speed bar.

To relate the transmission gears for reversing the automobile, the lever is moved into notch "R", this arranging the selector for coöperation with the bar 11 over the low speed bar.

Of course, after the selector has been positioned, the clutch pedal must be pushed in to complete the shifting operation, and when the pedal is released the spring 6 will return the several parts to normal position. Should the selector be turned before it has completely returned to normal position, the dog 23 will merely ride over the cam face 27 of any head which may be in its path, and the dog 24 yield in passing through the cut out 20.

While the present mechanism has here been shown in connection with automobiles, it is very obvious that the same is capable of many embodiments employing transmission gears. The operation is simple and safe, requiring only a preliminary manipulation of the lever 34, which is arranged within convenient reach beneath the steering wheel and is operable with little exertion as compared with the common form of lever shift now employed. The throwing out of the clutch is followed, in the same operation, by the shifting, proper, of the gears, and in this connection it will be observed that the clutch is rendered inoperative before the selector engages the head of the selected bar.

What is claimed is:

1. In a gear shifting mechanism, a support, spaced independently movable gear shifting bars thereon, common operating means for the bars, and means for holding the one bar inoperative by and during movement of the first means to move the other bar.

2. In a gear shifting mechanism, a support, spaced pairs of gear shifting bars slidable thereon, means for selectively sliding any bar to operative position, and means operable by and during the operation of the first means to hold the bars of the other pair in normal position.

3. In a gear shifting mechanism, a support, gear shifting members slidable thereon and projecting therefrom at each end, means selectively engageable with the members at one end to move them to operative position, and other means engageable with the members at their opposite ends to return them to normal position.

4. In a gear shifting mechanism, a frame, a plurality of gear shifting bars, a selector rod for engaging any predetermined bar, means for operating the rod, and means operable by the selector rod and movable relative thereto for returning the bars to normal position.

5. In a gear shifting mechanism, a support, gear shifting members slidable thereon and projecting therefrom at each end, a rotatable rod slidable through the support, a dog carried by the rod on one side of the support to engage the adjacent ends of said members to operate them, and means carried by the rod on the other side of the support to engage the corresponding ends of said members to return them to normal position.

6. In a gear shifting mechanism, a frame, a plurality of gear shifting bars, means connecting the bars in pairs and for effecting movement of one bar opposite to the movement of the companion bar when the latter is operated to shift a gear, means for moving the bars selectively, and means operable by the last aforesaid means and movable relative thereto for returning the bars to normal position.

7. In a gear shifting mechanism, a frame, a plurality of gear shifting bars, means connecting the bars in pairs for simultaneous but opposite movements, means for selectively operating the bars, means for holding the bars of each pair in normal position, and other means operable by the second means for coöperating with the third means for returning the gears to normal position.

8. In a gear shifting mechanism, a frame, a plurality of gear operating bars slidable therein, a selector rod slidable in the frame and carrying a spring actuated dog for engaging with and operating any one of the bars, and means operable by the rod on movement thereof to operate a bar for returning any operated bar to normal position.

9. In a gear shifting mechanism, a frame, a gear shifting bar slidably supported thereby, a selector rod arranged on the frame for movement to actuate the bar, means for operating the rod, and means operable by the rod and slidable on the frame for returning the bar to normal position.

10. In a gear shifting mechanism, a frame, a plurality of pairs of gear shifting bars slidable thereon, a connection between the bars of each pair whereby on movement of one bar the companion bar will be moved in an opposite direction, a head provided on one end of each bar, a selector rod rotatable and slidable on the frame, a spring pressed dog on the rod for engaging with the bar heads selectively, and a second spring pressed dog on the rod for returning the rods to normal position.

11. In a gear shifting mechanism, a frame, a plurality of pairs of gear shifting bars slidable thereon, a connection between the bars of each pair whereby on movement of one bar the companion bar will be moved in the opposite direction, a head provided on one end of each bar, a selector rod rotatable and slidable on the frame, a spring pressed dog on the rod for engaging with the bar heads selectively, a bar returning member slidable on the frame adjacent each pair of bars and having a part extending across the paths of the adjacent bars for engaging the opposite ends thereof, and means under the control of the rod for engaging the member to return the bars to normal position and retain them in said position.

12. In a gear shifting mechanism, a frame, spaced pairs of gear shifting bars thereon, means connecting the component bars of each pair whereby movement of a bar in one direction will effect opposite movement of the companion bar, heads on the forward ends of the bars, means engageable with the opposite ends of both bars of each pair for returning the latter to normal position, and means for operating the bars and the last aforesaid means, said second means operating one of the first means on movement of the former to engage the head of one of the bars uncontrolled by the specified first means.

13. In a gear shifting mechanism, a frame, spaced pairs of gear shifting bars thereon, means connecting the component bars of each pair whereby movement of a bar in one direction will effect opposite movement of the companion bar, the frame being provided with guideways, a gear controlling member for each pair of bars consisting of a shank slidable in the respective guideway and an angularly related head on the shank with which the bars engage, means for selectively operating the bars, and other means operable by the second means for engaging the head of one gear controlling member on movement of said second means to operate a bar of another pair.

14. In a gear shifting mechanism, a frame, spaced pairs of gear shifting bars thereon, means connecting the component bars of each pair whereby movement of a bar in one direction will effect opposite movement of the companion bar, the frame being provided with guideways, a gear controlling member for each pair of bars consisting of a shank slidable in the respective guideway and an interned head on the shank for engaging the bars, the heads of said gear controlling members opposing one another and having complemental cut outs, a slidable and rotatable selector rod interposed between the pairs of bars on the frame and extending through the cutouts between the heads, a dog on the rod engageable with either head for returning the respective bars to normal position, means carried by the rod for selectively engaging any bar, and means for connecting the bars to a transmission gearing.

15. In a gear shifting mechanism, a frame, spaced pairs of gear shifting bars thereon, means connecting the component bars of each pair whereby movement of a bar in one direction will effect opposite movement of the companion bar, the frame being provided with guideways, a gear controlling member for each pair of bars consisting of a shank slidable in the respective guideway and a head on the shank for engaging the bars, a selector slidable on the frame between the pairs of bars, and spaced means on the selector, one for engaging the bars to operate the same and the other for engaging the head of a controlling member to return the bars to and holding them in normal position.

16. In a gear shifting mechanism, a frame, spaced pairs of gear shifting bars thereon, means connecting the component bars of each pair whereby movement of a bar in one direction will effect opposite movement of the companion bar, the frame being provided with guideways, a gear controlling member for each pair of bars consisting of a shank slidable in the respective guideway and a head on the shank for engaging the bars, a selector slidable on the frame between the pairs of bars, a dog on the selector for engaging any rod to actuate it, a second dog carried by the selector for engaging the heads selectively to return the bars to normal position, and means for operating the selector.

17. In a gear shifting mechanism, a frame, spaced pairs of gear shifting bars thereon, means connecting the component bars of each pair whereby movement of a bar in one direction will effect opposite movement of the companion bar, the frame being provided with guideways, a gear controlling member for each pair of bars consisting of a shank slidable in the respective guideway and a head on the shank for engaging the bars, a selector slidable on the frame between the pairs of bars, a dog on the selector for engaging any rod to actuate it, a second dog mounted on the selector for limited sliding movement, a spring yieldingly holding the second dog in its forward position, and means for operating the selector.

18. In a gear shifting mechanism, a support, spaced pairs of gear shifting bars slidable thereon, means for moving either bar of one pair to operative position, and means yieldably connected to the first means for returning and holding the other pair of bars in normal position.

19. In a gear shifting mechanism, a support, spaced pairs of gear shifting bars slidable thereon, a selector slidable and rotatable on the support for operating the bars selectively, and a bar-returning member slidably and yieldably carried by the selector to be operated thereby preliminary to the actuation of the newly selected bar.

20. In a gear shifting mechanism, a support, spaced pairs of gear shifting bars slidable thereon, a selector slidable and rotatable on the support for operating the bars selectively, and a bar-returning member slidably and yieldably carried by the selector to be operated thereby preliminary to the actuation of the newly selected bar, said bar-returning member operating to return all bars to normal position when the selector is moved into a neutral position.

21. In a gear shifting mechanism, a support, gear shifting members slidable thereon, an actuator member, means carried by the latter to engage any gear shifting member for moving the same to operative position, and other means arranged on the actuator to return an operated gear shifting member to inoperative position in advance of said first means becoming operative and during movement of the actuator to render the first means operative.

In testimony whereof I affix my signature in presence of a witness.

FRANK C. SANFORD.

Witness:
M. T. LONGDEN.